United States Patent [19]

Wicht

[11] Patent Number: 5,634,000

[45] Date of Patent: May 27, 1997

[54] POWER-FAIL RETURN LOOP

[75] Inventor: Philippe Wicht, Bulle, Switzerland

[73] Assignee: Ascom Autelca AG, Bern, Switzerland

[21] Appl. No.: 738,345

[22] Filed: Jul. 31, 1991

[51] Int. Cl.$^6$ ........................................................ G06F 1/30
[52] U.S. Cl. ...................................................... 395/182.08
[58] Field of Search .................. 371/66, 12; 364/918.52, 364/464.02, 273.4, 464.03, 466, 101, 235, 127; 395/182.08, 182.12, 182.2

[56] References Cited

U.S. PATENT DOCUMENTS

| | | | |
|---|---|---|---|
| 3,938,095 | 2/1976 | Check, Jr. et al. | 340/172.5 |
| 4,285,050 | 8/1981 | Müller | 364/900 |
| 4,323,987 | 4/1982 | Holtz et al. | 365/229 |
| 4,547,853 | 10/1985 | Eckert | 364/464 |
| 4,675,841 | 6/1987 | Check, Jr. et al. | 364/900 |
| 4,701,856 | 10/1987 | DiGiulio et al. | 364/466 |
| 4,746,818 | 5/1988 | Hafner | 307/363 |
| 4,747,057 | 5/1988 | DiGiulio et al. | 364/464 |

FOREIGN PATENT DOCUMENTS

| | | |
|---|---|---|
| 0075825 | 4/1983 | European Pat. Off. . |
| 0197345 | 10/1986 | European Pat. Off. . |
| 2062311 | 5/1981 | United Kingdom . |

*Primary Examiner*—Robert W. Beausoliel, Jr.
*Assistant Examiner*—S. Elmore
*Attorney, Agent, or Firm*—Brumbaugh, Graves, Donohue & Raymond

[57] ABSTRACT

A computerized system is of the type that responds to imminent loss of power by storing crucial data to a safe storage area. In the system, lockup caused by the system entering a tight loop awaiting power loss, is avoided by a combination of stored program and hardware. A test performed in the tight loop checks repeatedly to see whether the power-failure signal comes no longer to be present, and if that condition occurs the stored program causes the meter to return to normal function. As a consequence momentary power losses and other brief interruptions, whether due to user manipulation of the power switch or otherwise, are much less likely to result in undesired lockup of the system.

12 Claims, 2 Drawing Sheets

POWER-FAIL RETURN LOOP

BACKGROUND OF THE INVENTION

This invention relates generally to handling loss of power in a computerized apparatus, and relates more particularly to the optimal handling of a condition of return of power following the initiation of the handling of loss of power.

It is commonplace to use a processor (typically a microprocessor) under stored program control to replace or augment functions previously performed by mechanical apparatus or by dedicated circuitry. The many internal states of the processor, stored in processor registers, are lost if the processor loses power. Similarly the contents of a volatile RAM chip are lost if power to the RAM chip is lost. In many consumer products using a processor there is no particular need to save the processor states or RAM contents, so that turning the product off cuts power to the processor and the RAM, and as a result the processor states and RAM contents are lost. This is the case, for example, with most personal computers depending on the application program being executed. If the user has entered data into the RAM of the computer, to avoid losing the data the user must typically explicitly invoke a routine for storing data to a nonvolatile memory (such as to a magnetic medium) before turning off the computer. In other systems some or all the RAM is made nonvolatile, typically by providing a backup battery that preserves the memory contents.

The integrity of the stored data is threatened not only by the possibility of loss of power to the memory device itself, but also by the possibility the CPU or data bus may during loss of power give rise to a condition that makes a spurious change to the stored data. For example, during the nonzero time interval during which power to the processor and address decoder drops from nominal levels (5 VDC) to zero, there is the possibility the CPU may execute an instruction that changes important data. This could occur if the processor were to perform a "write" transaction on the data bus to a harmless location, with the address decoder (because of less-than-nominal power) incorrectly decoding the address to some location containing crucial data. The result would be a spurious change in the value of the crucial data.

In many such systems the risks relating to possible loss of power are of little concern since important information will have been backed up elsewhere, or is capable of being reconstructed from other sources if necessary. Likewise the prospect of processor malfunction or data bus or address decoder malfunction that overwrites important information is not particularly daunting, again because it is usually quite straightforward and workable to let the user reconstruct important data, if suspected of being incorrect, from a backup or other sources.

One type of equipment typically having information stored in nonvolatile RAM is the electronic postage meter. In such postage meters the amount of postage available for printing is typically stored in what is called the "descending register". In postage meters it is important that the descending register is to be stored in such a way that there is minimal likelihood of the user printing postage which has not been paid for. For example, when the meter is turned off and later turned back on, the descending register is to have an unchanged value.

Before the development of electronic postage meters it was commonplace to use mechanical meters, that is, meters in which the descending register is a mechanical device. In a meter employing a mechanical register with value stored in gear positions, the requirement of the descending register remaining unchanged is satisfied by the simple fact of the gears maintaining position with or without external electric power. Such a meter maintains the register contents both in the face of a normal termination of power and in the face of an accidental or unintentional termination of power.

In recent years mechanisms having many moving parts have been replaced with simpler mechanisms in which many formerly mechanical functions are accomplished by a processor under stored program control. In such cases, pure mechanical registers are replaced with RAM memory. This has been the case with postage meters and their descending registers, as in the above-mentioned electronic postage meters.

As in other electronic equipment with nonvolatile memory, with electronic postage meters there is the nonzero probability of loss of the information in the nonvolatile memory due to processor, address decoder, or data bus malfunction. By definition the amount of postage available for printing is a particular stored value that is assumed to be correct. While the availability of a backup copy of data is satisfactory for, say, a word-processed document it is not very satisfactory for a postage meter descending register. In a postage meter it should not be within the discretion of the user to determine unilaterally, for example, that the descending register contents in the nonvolatile RAM are to be ignored and overwritten with supposedly correct backup data from some source that is within the control of the customer. Instead, if customers and the postal authorities are to be satisfied with the meter the stored value must have an exceedingly high level of confidence as to its correctness.

Similar imperatives present themselves in other electronic equipment where a stored value must be correct to a high degree of confidence and where it is of little or no utility to consider external backups and the like. These include gas pumps, automated teller machines, smart credit cards, and cash registers.

In an electronic system employing a processor and storing crucial data in RAM, it is necessary to ensure that the system maintain its crucial data unchanged after the power is turned off and back on, even in the midst of other operations. The system typically has a power supply which gives power to the processor and other circuitry for a time interval after external power is switched off. The power provided during this interval is sometimes called "reserve" power. The system design may have a power-failure warning signal, generated by the power supply circuitry, which provides what might be termed an "early warning" to the processor. The design of the stored program for the system typically provides that arrival of the power-failure warning signal invokes a routine for storing data to nonvolatile memory or updating information in the nonvolatile memory.

The routine of the stored program that is responsive to the power-failure warning signal, as just mentioned, has as one of its first tasks the updating of crucial data. The reserve power, typically provided by a large electrolytic capacitor together with other circuitry, is designed so that the interval during which reserve power is reliable exceeds by a comfortable margin the time required for completion of the data-updating routine. In the particular case of a postage meter, for example, the interval during which reserve power is reliable exceeds the time required to update the descending register as needed. The interval is also long enough to permit the processor to indicate by a particular message that power was lost in the midst of a postage printing operation, if such be the case. In the latter case, upon the restoration of power to the meter the processor encounters the message and updates the descending register accordingly.

A decision facing the designer of an electronic system containing crucial data is what to have the processor do after it has finished its required tasks responsive to the receipt of the power-failure warning. That is, the reserve power will presumably persist for some time after the data-updating activities have been completed pursuant to the stored program. When the reserve power runs out, the processor stops completely. But prior to that, it is desired that the processor not cause any harm to the crucial data such as the nonvolatile memory, so the stored program will typically put the processor into a tight loop, that is a loop which does nothing externally observable other than to keep the processor occupied. This loop, often called a "power-fail" loop, may be as simple as a few null instructions and a jump. One way that keeping the processor in such a loop minimizes risk to crucial data is that few transactions take place on the bus, and none of the transactions are write transactions.

Putting the processor into a tight loop prior to the eventual loss of reserve power can give rise to an anomalous result, from the user's point of view, if external power is returned during the time that the processor is using the reserve power. That anomalous result is lockup of the equipment. The processor remains in the tight loop, and does not respond to user keyboard inputs, even though there is no apparent power loss causing this result. One way this lockup might come about is a rapid switching of the equipment off and back on. Another way this might come about is a momentary loss of external AC power. The lockup can happen in either of two ways—(i) return of external power after the power-failure warning arrived and before the processor has entered the tight loop (i.e. during the routine that saves data to the nonvolatile memory), or (ii) return of external power after the processor has entered the tight loop and before loss of reserve power (i.e. during the execution of the tight loop). In equipment having such a design, the only way to free the meter from the lockup is to turn it off, leave it off long enough for the reserve power to be exhausted, and turn it back on. But the user may not know this, or may be unaware of the cause and so only perceive a malfunction. An example of such a loop may be seen in the postage meter of U.S. Pat. No. 4,675,841 at col. 14, line 59. In that system, "[t]he main program can only be re-entered through a complete power-up cycle".

In electronic systems having crucial data, then, it is desirable to minimize risk to the data during the period of loss of power, and yet to avoid the problem of system lockup if the loss of power is brief.

SUMMARY OF THE INVENTION

In the equipment according to the invention, the lockup due to momentary power loss is avoided by use of a combination of stored program and hardware. A test performed in the tight loop checks repeatedly to see whether the power-failure condition comes no longer to be present, and if that is the case the stored program causes the equipment to return to normal function. The repeated test can be a determination whether a power-failure warning signal is no longer present. As a consequence, momentary power losses and other brief interruptions, whether due to user manipulation of the power switch or otherwise, are much less likely to result in undesired lockup of the meter.

BRIEF DESCRIPTION OF THE DRAWINGS

An exemplary embodiment of the invention is described with reference to drawings, of which.

Throughout the figures, like elements have been indicated where possible with like reference numerals.

DETAILED DESCRIPTION OF THE EMBODIMENT

Figure 1:
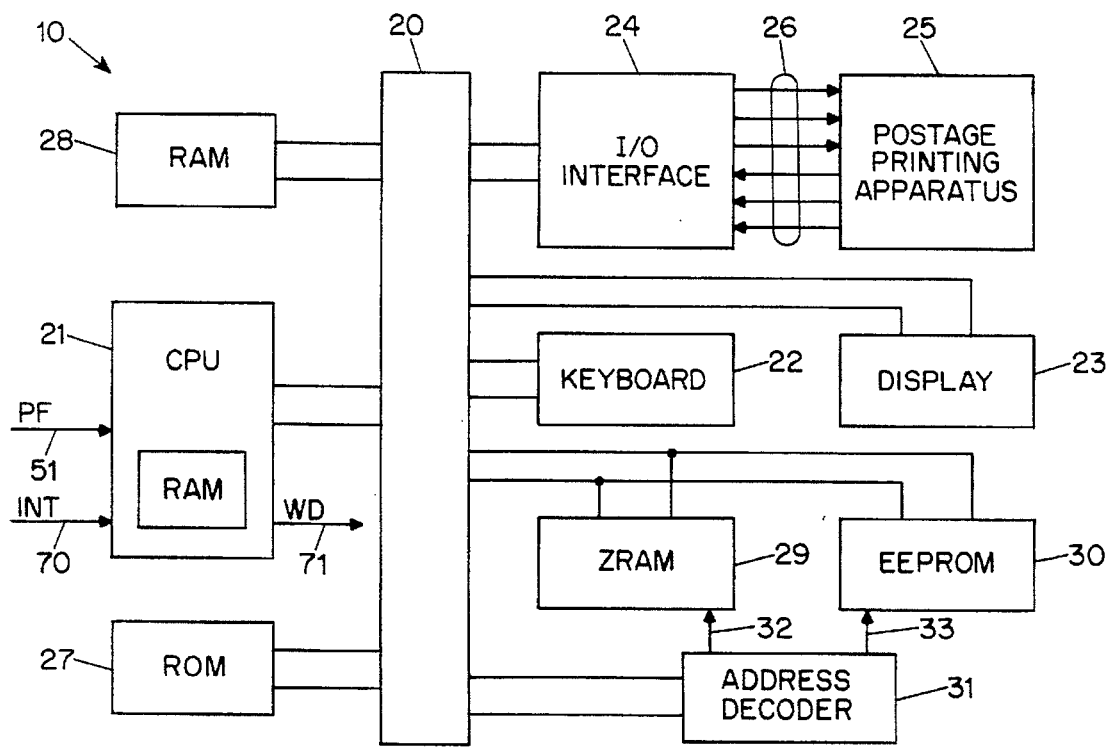
FIG. 1 is a functional block diagram of a computer system in accordance with the invention.

Referring to FIG. 1, an exemplary postage meter system centers on a parallel address, control, and data bus 20. A central processing unit (CPU) or processor 21 executes a stored program from ROM 27 by means of the usual process, initiated by power-up or by hardware reset, whereby instructions are fetched and executed starting at a predetermined starting address. In the exemplary embodiment the processor is a conventional Intel 8051 processor, and execution initializes at 0000H (hex); the address space of the processor is laid out so that address 0000H falls within the ROM. The exemplary 8051 processor has built-in RAM and ROM, but the stored program is of such complexity that far more RAM and ROM are required. ROM 27 and RAM 28 are meant to indicate both the internal and external ROM and RAM.

Although most of the system, including the bus 20, is concealed from the user, some parts are designed specifically for user interaction. These include a keyboard 22, a display 23, and some parts of a postage printing apparatus 25. The latter is controlled by the processor 21 through an I/O interface 24, which connects to the postage printing apparatus 25 by means of a large number of discrete wires, indicated schematically by the six discrete signals 26. Also designed for user interaction are a power switch, not shown in FIG. 1, forming part of a power supply, also not shown in FIG. 1.

The system of the exemplary embodiment is intended for use as a sophisticated and reliable postage meter. As mentioned above it is necessary to store crucial information such as the amount of postage remaining to be printed i.e., the content of the descending register. The system 10 allows such crucial information to be stored in either or both of two nonvolatile memories: a CMOS static RAM 29 having a dedicated lithium battery so as to preserve information in the absence of power external to the system, and an electrically erasable programmable read-only memory (EEPROM) 30. Conventional chip-select lines 32 and 33 activate one or another of RAM 29 and EEPROM 30 as controlled by address decoder 31. (The other residents in the address space of the processor 21 receive chip-select and other address decoding signals from other address decoding circuitry omitted from FIG. 1 for clarity, and the address decoding circuitry is of known design.)

Figure 2:
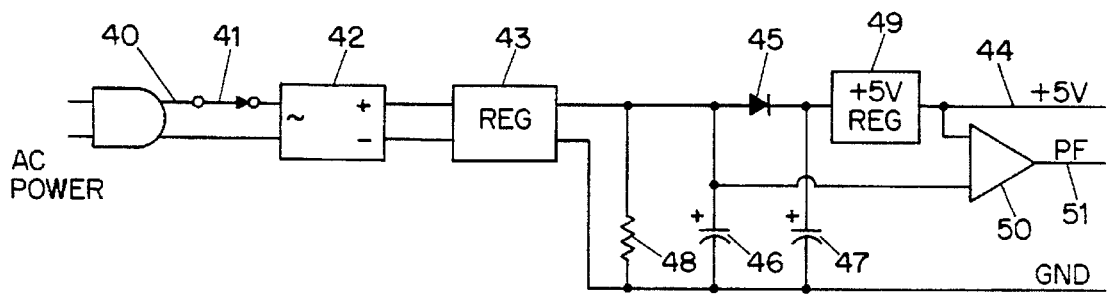
FIG. 2 is a functional block diagram showing the power supply for the system of the exemplary embodiment.

Turning now to FIG. 2, there is shown in functional block diagram form the power supply for the system 10. AC power is provided to the system at a power cord 40. If a power switch 41 is closed (conducting) then a transformer/bridge rectifier 42 supplies rectified AC to a regulator 43. The regulator 43 provides a +24V DC level at a first electrolytic capacitor 46. The AC power cord 40, switch 41, rectifier 42 and regulator 43 constitute a typical interruptible source of power for a computer system. A second electrolytic capacitor 47 carries a somewhat lower voltage due to the voltage drop of diode 45. A second regulator 49 drops the +24V to high quality +5V at a line 44.

In many simple computerized systems a single electrolytic capacitor provides filtering in combination with regulator circuitry like that of regulator 43. In the supply of FIG. 2, however, the two electrolytic capacitors 46 and 47 are provided, disposed as shown in FIG. 2, acting as first and second power supplies respectively during significant fluctuations in the AC power supplied to the system.

The "downstream" second capacitor 47 is chosen to be quite large in value, large enough to power the processor and related circuitry for several hundred milliseconds after loss of AC power at the power cord 40. In the event of loss of AC power at the power cord 40, the capacitor 46 discharges with a time constant determined by the size of the capacitor 46 and the impedance of the surrounding circuitry, shown generically as a resistor 48. The time constant is selected to be very short, so that the capacitor 46 discharges far faster than the capacitor 47. A reduced voltage level on the capacitor constitutes a first signal indicative of the loss of power. A comparator 50 constantly compares voltages that depend on the relative conditions of the two capacitors, so that a signal PF at a line 51 out of the comparator gives several hundred milliseconds of advance warning of imminent power failure.

It is, of course, known in the prior art to have a power failure signal which gives advance warning to a processor of a pending power failure. The system of the present invention has the further advantage that the event of power returning after the power-fail signal has been generated is also annunciated to the processor. The arrangement of FIG. 2 provides such annunciation of return of power. If AC power is restored at a time when the capacitor 47 has not yet been discharged (i.e. the processor 21 is still functioning) then the capacitor 46 is again fully charged, its restoration to full charge provides a second signal indicative of the restoration of power.

Contemporaneously therewith the capacitor 47 is likewise returned to a state of full charge through the diode 45. Responding to the increased voltage on the capacitor 46, the comparator 50 changes to its other output value, and the processor, not shown in FIG. 2, is able to take account of this transition in the value of the PF signal.

One skilled in the art will appreciate that while the arrangement of FIG. 2 uses a single line to convey to the processor both the imminent loss of power and the restoration of power, the system would also offer the benefits described herein if separate lines carried the two types of information. For example, one comparator or equivalent circuit could provide the interrupt to the processor indicative of imminent loss of power, while a separate circuit, implemented with a comparator or similar circuitry, could provide a discrete signal indicative of restoration of power. The latter signal could be an interrupt or would preferably be polled by the processor. One skilled in the art will also appreciate that for the benefits described herein it is not necessary that the two signals change state simultaneously. To minimize component count and simplify design, however, the preferred arrangement is that shown in FIG. 2, with a single line providing both items of information.

The foregoing discussion covers the sequence of events in the case of loss of power at the power cord 40, and the possible later return of power. The same sequence of events occurs in the event of the user turning off the power switch 41, and the possible later return of power due to the user's turning the power switch 41 back on.

Figure 3:
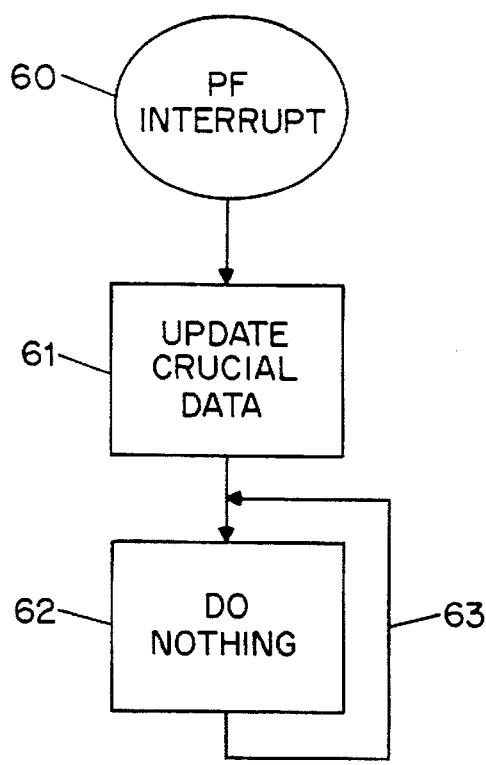
FIG. 3 is a flowchart illustrating a fragment of a typical prior art stored program including a tight loop.

Turning now to FIG. 3, there is shown in flowchart form a fragment of a typical prior art stored program of the type which might appear in a prior art system programmed to respond to imminent loss of power. In the fragment shown, the entry point 60 assumes that a PF signal, like that for the comparator 50 of FIG. 2, has changed from its normal state to the state indicative of imminent loss of power. This signal change, in many prior art systems, is a hardware-level interrupt to the processor 21. (Of course, in other prior art systems the entry point 60 represents the event of the CPU polling the PF signal and branching to the entry point. Whether the branch is polled or interrupt-driven is of no importance to the discussion that follows, and for clarity only the interrupt-driven case is detailed.)

In prior-art computerized systems the next step undertaken by the processor 21 is to update and/or store any crucial data, shown by block 61. In systems where there is interaction with a controlled mechanical process, block 61 also includes steps intended to bring the mechanical process to an orderly halt. For example, where the system is a postage meter, the printing of postage is brought to an orderly conclusion, or interrupted along its routine, through appropriate outputs to I/O interface 24 of FIG. 1.

Continuing the discussion of prior art FIG. 3, the processor 21 does nothing in block 62. Control passes from that block via flowchart arrow 63 back to block 62, forming what is sometimes called a tight loop or power-fail loop. In the case where loss of AC power is final (e.g. persists for some time) then the tight loop continues to be executed until the processor 21 ceases functioning due to inadequate +5V power.

The precise stored program giving rise to the flowchart of FIG. 3 may be in any of several forms depending on the programming tools used to generate the code stored in the ROM 27. In a language with GOTO commands, such as BASIC or FORTRAN, the construct is typically a line such as 1000 GOTO 1000. In a structured language such as C or Pascal the source code construct can be a DO-WHILE loop where the condition for continued execution of the loop is an expression evaluating to T (true). In assembly language the programmer may use a no-op opcode, followed by a jump back to the memory location containing the no-op. Or the programmer may use a jump instruction that may do no more than jump to itself. Finally, the programmer may choose to have instruction flow lead to a halt instruction if available in the instruction set of the particular processor in use; this choice differs from the previous choices in that the processor is no longer in a loop at all.

The particular programming technique used to put the processor in a tight loop, also called a power-fail loop, is not material to the discussion that follows. What is important is to consider what happens if power is restored to the computerized system at a time when the processor 21 is executing the block 61 or the flowchart portions 62 and 63. Stated plainly, the system appears to the user to be broken. The system does not do any of the things it is supposed to do, because it is either stuck in the tight loop of 62 or 63, or soon will be because it is now in block 61.

The consequences of the processor being stuck in the tight loop vary depending on the use to which the computerized system is put and the nature of the user interaction. A few examples will suffice to show the importance of the problem.

Consider the case where the computerized system is a postage meter. The user has perhaps recently loaded several thousand dollars worth of available postage into the meter, and is accustomed to being able to press a key sequence at the keyboard 22 to summon up a report of the stored postage on the display 23. This key sequence may be invoked as often as desired to provide a level of confidence that the stored postage has not been lost due to, say, malfunction of the memory device containing the digital representation of the amount of postage.

In the case where power is restored while the processor is in block 61 or portions 62 and 63, the meter is unresponsive. Nothing pressed at the keyboard 22 makes anything change at the display 23. Most disconcertingly, the display 23 may be locked into showing some previous contents, which contents do not change no matter which keys are pressed.

The only way the user is able to restore the meter to normal function is to cut power for some time, either by unplugging the meter or by leaving the power switch 41 off. By doing this, the user brings about the condition of capacitor 47 discharging so far that the processor 21 no longer has a meaningful internal state, and is no longer executing the stored program.

For simplicity it is assumed that this means capacitor 47 is completely discharged, and that processor 21 is simply unpowered. In reality processor 21 ceases having a meaningful internal state, and stops fetching and executing instructions, long before the power supplied to its +5V power pin drops to zero. The level at which the processor does this varies from one model of processor to the next, and the precise level is not important to the later discussion.

Figure 4:
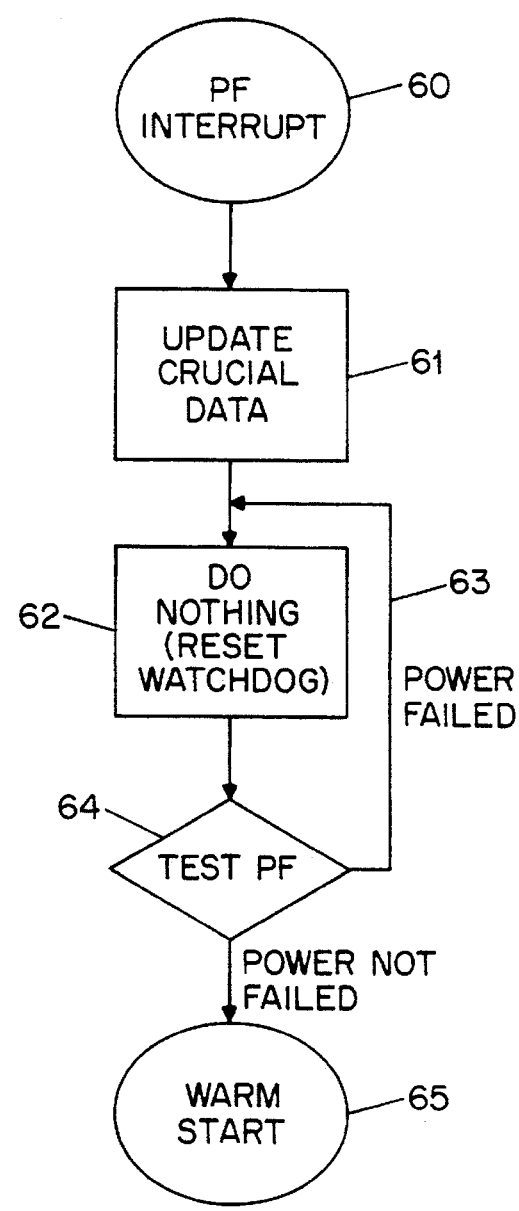
FIG. 4 is a flowchart illustrating a fragment of a stored program corresponding to that of FIG. 3, but differing in its inclusion of testing and warm starting according to the invention.

There is shown in FIG. 4, in flowchart form, a fragment of a stored program corresponding to that of FIG. 3, but differing according to the teachings of the invention. In the exemplary embodiment this fragment forms a portion of the stored program in ROM 27. Reference designations of FIG. 4 are assigned to correspond, to the extent possible, to those of FIG. 3.

As with FIG. 3, the entry point 60 assumes that the PF signal has changed from its normal state to the state indicative of imminent loss of power. In the exemplary embodiment the entry point is a hardware interrupt to the processor 21.

As in FIG. 3 the next step undertaken by the processor 21 is to store any crucial data and to bring mechanical processes to an orderly halt, shown by block 61. Also as in FIG. 3, the processor 21 does nothing in block 62. Significantly, and differing from prior art FIG. 3, in the system of FIG. 4 control then passes to a decision block 64, where the condition of the power-fail signal is tested. In the case where power loss continues to be imminent, control passes from that block via flowchart arrow 63 back to block 62, forming a loop corresponding to the above-mentioned tight loop or power-fail loop. In the case where loss of AC power is final (e.g. persists for some time) then the tight loop continues to be executed until the processor 21 ceases functioning due to inadequate +5V power. However, if power has been restored during the activities of block 61, or during the time that the tight loop or power-fail loop of 62, 64, and 63 is being executed, then the test of block 64 will cause control to be passed to exit point 65. Exit point 65 leads to a so-called "warm start" routine, in which the system returns to normal function.

A "warm start" routine is so named to distinguish from a "cold start" routine. The "cold start" routine assumes that the system was unpowered just prior to the execution of the routine. All computerized systems by definition have a "cold start" routine, whether or not it is so named. It is the routine that the processor executes upon application of power. Most processors, at power-up, start with a program counter (also called instruction pointer) initialized to zero, and so the cold-start routine is placed starting at address 0000H in the processor's address space. The system of the exemplary embodiment does precisely that, as described above, with the ROM 27 starting at 0000H in the address space.

A "warm start" routine, on the other hand, is written by the programmer to cover the condition of the processor restarting at a time when at least some of the system is assumed to have been satisfactorily powered prior to the execution of the routine. (In some systems, the same routine may serve both the "warm start" and "cold start" eventualities.) Depending on system details, the "warm start" routine may omit certain power-on formalities such as checksums and system self-tests that would be disconcerting to the user or would impose undue delay. The "warm start" routine may also omit initialization of other system states (e.g. position of mechanical elements or contents of flip-flops) where those states can be assumed to be good due to the fact that power was not really lost. The precise programming decisions made in writing such a "warm start" routine as distinguished from a "cold start" routine are not important to the invention and will be readily apparent to the programmer utilizing the invention in a particular computerized system. Most, if not all, of the benefits of the invention's teachings are available even if the test of block 64 of FIG. 4 leads to the same routine as is executed upon power-up.

Figure 5:
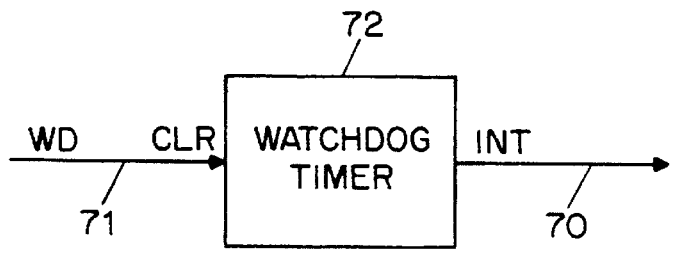
FIG. 5 is a functional block diagram showing a watchdog timer and its input and output signals.

In the system according to the exemplary embodiment a watchdog circuit 72, shown in FIG. 5, monitors the processor's continued function. The stored program of the processor 21 is such that from time to time the processor 21 sends a signal to the watchdog 72 via line 71, shown in both FIGS. 1 and 5; if this signal fails to be received by the watchdog 72 at least as often as a predetermined frequency, then the watchdog 72 takes action to minimize permanent harm. In the exemplary embodiment in this event the watchdog generates a reset signal communicated to the processor 21 by line 70, shown in both FIGS. 1 and 5. The watchdog preferably counts to a predetermined total that generates the interrupt, but the counter is cleared upon receipt of the signal of line 71 at a clear input of the watchdog 72. Because of the presence of such a watchdog 72 in the system, the "do nothing but reset watchdog" block 62 of FIG. 4 thus must contain an instruction to send the signal of line 71 to the watchdog 72.

One skilled in the art will appreciate that while the teaching of the invention has been illustrated in the particular case of a computer system which acts as a postage meter, the invention properly construed offers its benefits to any computerized system where important data or system states are to be stored to avoid their loss. Such computerized systems include automated teller machines, banking terminals of all types, vending machines, gambling machines, and voting machines. One skilled in the art will also appreciate that while the teaching of the invention has been illustrated in the context of a processor executing a stored program, the invention offers its benefits as well in the case of systems constructed of random logic circuitry where important data or system states are to be stored. Thus, although a specific preferred embodiment of the invention has been described, this should not be construed as limiting the scope of invention, defined in the appended claims.

We claim:

1. In a computer system having a processor, and program-containing nonvolatile memory, a first temporary power supply and a second temporary power supply, the first power supply powered by an interruptible source, the second power supply providing power for a time interval following interruption of the interruptible source and loss of power in the first power supply, signaling means for providing a first signal indicative of loss of power in the first power supply while the second power supply is providing power, and a second signal indicative of restoration of power in the first power supply, said processor and program comprising power-fail-control means including:

power fail responsive means responsive to the first signal, indicative of loss of power in the first power supply while the second power supply is providing power, for causing the processor to enter a power-down routine including steps in which the processor makes no further reference to the nonvolatile memory and remains in said steps until loss of power from said second power supply; and power restoration responsive means operative when the processor is in the power-down routine and responsive to the second signal indicative of restoration of power in the first power supply, for causing the processor to exit the power-down routine.

2. The computer system of claim 1 wherein said interruptible source includes means for connection to a public power supply.

3. The computer system of claim 1 wherein said interruptible source is interruptible by a power switch actuable by a user.

4. The computer system of claim 1 wherein said second power supply comprises an electrolytic capacitor of sufficient capacity to power the system during an orderly shutdown.

5. The computer system of claim 1 wherein the first power supply comprises a further electrolytic capacitor having a time constant shorter than that of the capacitor of the second power supply.

6. The computer system of claim 1 wherein said system is an electronic postage meter, said system further comprising a descending register in the nonvolatile memory, a keyboard, and a postage printing means, the processor executing a stored program whereby postage is printed at the postage printing means if an amount requested by a user by inputs to the keyboard is available in the descending register.

7. The computer system of claim 1 wherein the signaling means comprises a comparator with a first input means and a second input means, the first input means receiving a signal related to the presence of the first power supply, and the second input means receiving a voltage dependent on the second power supply, the output of the comparator providing an output signal a state of which is indicative of loss of power in the first power supply, and another state of which is indicative of restoration of power in the first power supply.

8. The computer system of claim 7 wherein the second power supply comprises an electrolytic capacitor of sufficient capacity to power the system during an orderly shutdown.

9. The computer system of claim 1 wherein the power-down routine includes steps causing the processor to update data in the nonvolatile memory.

10. A power down, power up method for use in a computer system having a processor, nonvolatile memory containing program, said method comprising;

providing a first power supply and a second power supply capable of providing power for a time interval following loss of input power thereto, powering the first and second power supplies by an interruptible source, producing a first signal, a state of which is indicative of loss of power in the first power supply while the second power supply is providing power, and a second signal, a state of which is indicative of restoration of power in the first power supply, responding to the state of the first signal indicative of loss of power in the first power supply by interrupting program execution, causing the processor to enter a power-down routine in which the processor makes no further reference to the nonvolatile memory and remains in said routine until loss of power from said second power supply if the system continues to be provided with insufficient power from the interruptible source; and responding to continued presence of power from said second power supply, and to the second signal indicative of restoration of power in the first power supply, by causing the processor to exit the power-down routine and to resume program execution.

11. The method of claim 10 in which the step of responding to the first signal indicative of loss of power in the first power supply by interrupting program execution further comprises updating data in the nonvolatile memory.

12. The method of claim 10 in which the step of responding to the continued presence of power from said second power supply and to the second signal indicative of restoration comprises a warm start routine.

\* \* \* \* \*